(12) United States Patent
Valdes De La Garza et al.

(10) Patent No.: US 11,046,437 B2
(45) Date of Patent: Jun. 29, 2021

(54) FORWARD-FACING AIRCRAFT PASSENGER SUITE WITH ALL AISLE ACCESS

(71) Applicant: B/E Aerospace, Inc., Winston-Salem, NC (US)

(72) Inventors: Javier Valdes De La Garza, Winston-Salem, NC (US); Glenn A. Johnson, Rural Hall, NC (US); Daniel I. Udriste, Winston-Salem, NC (US); Alexander N. Pozzi, Winston-Salem, NC (US); Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/989,614

(22) Filed: Aug. 10, 2020

(65) Prior Publication Data

US 2020/0369388 A1    Nov. 26, 2020

Related U.S. Application Data

(60) Division of application No. 15/496,349, filed on Apr. 25, 2017, now Pat. No. 10,773,804, which is a continuation-in-part of application No. 15/436,482, filed on Feb. 17, 2017, now Pat. No. 10,661,903.

(60) Provisional application No. 62/296,659, filed on Feb. 18, 2016.

(51) Int. Cl.
*B64D 11/06*      (2006.01)

(52) U.S. Cl.
CPC ........ *B64D 11/0601* (2014.12); *B64D 11/064* (2014.12); *B64D 11/0604* (2014.12); *B64D 11/0605* (2014.12); *B64D 11/0606* (2014.12); *B64D 11/0638* (2014.12); *B64D 11/0641* (2014.12); *B64D 11/0643* (2014.12)

(58) Field of Classification Search
CPC ... B64D 11/06; B64D 11/0601; B64D 11/602; B64D 11/0606; B64D 11/064; B64D 11/0641; B64D 11/0643
See application file for complete search history.

(56) References Cited

U.S. PATENT DOCUMENTS

| | | | |
|---|---|---|---|
| 8,936,214 B2 * | 1/2015 | Foucher ................... | B60N 2/34 244/118.6 |
| 8,998,139 B2 | 4/2015 | Dryburgh et al. | |
| D733,442 S * | 7/2015 | Dryburgh ...................... | D6/356 |
| 9,315,270 B2 | 4/2016 | Dryburgh et al. | |
| 9,409,648 B2 | 8/2016 | Eakins | |
| 9,446,848 B2 | 9/2016 | Jerome et al. | |

(Continued)

*Primary Examiner* — Benjamin P Lee
(74) *Attorney, Agent, or Firm* — Suiter Swantz pc llo (57) ABSTRACT

Passenger seating groups positionable in a column in an aircraft between a longitudinal aisle and a fuselage wall. Each passenger seating group includes a first passenger seat positioned along an aisle side and facing a first direction, a first footwell positioned along the aisle side and facing the first passenger seat, a second passenger seat positioned along the wall side and facing the first direction, and a second footwell positioned along the wall side and facing the second direction to serve a second passenger seat in an adjacent like seating group. Each seat has its own dedicated entry from the longitudinal aisle and seats within the same seating group are physically separated by privacy walls.

14 Claims, 6 Drawing Sheets

(56) References Cited

U.S. PATENT DOCUMENTS

| | | | |
|---|---|---|---|
| 9,533,765 B2 | 1/2017 | Vergnaud et al. | |
| 9,718,550 B2 | 8/2017 | Ko | |
| 9,783,302 B2 | 10/2017 | Eakins | |
| 9,944,397 B2 | 4/2018 | Vergnaud et al. | |
| 10,532,817 B2* | 1/2020 | Morgan | B64D 11/0641 |
| 10,604,260 B2* | 3/2020 | Kasuya | B64D 11/0606 |
| 10,647,221 B2* | 5/2020 | Trillaud | B60N 3/001 |
| 2012/0292957 A1 | 11/2012 | Vergnaud et al. | |
| 2013/0032668 A1* | 2/2013 | Foucher | B60N 2/242 |
| | | | 244/118.6 |
| 2013/0068887 A1 | 3/2013 | Ko | |
| 2013/0106156 A1* | 5/2013 | Orson | B64D 11/064 |
| | | | 297/217.3 |
| 2014/0283296 A1 | 9/2014 | Jerome et al. | |
| 2014/0306500 A1 | 10/2014 | Dryburgh et al. | |
| 2015/0166184 A1 | 6/2015 | Dryburgh et al. | |
| 2016/0083094 A1* | 3/2016 | Clucas | B64D 11/0601 |
| | | | 244/118.6 |
| 2016/0311535 A1 | 10/2016 | Eakins | |
| 2017/0029117 A1 | 2/2017 | Vergnaud et al. | |
| 2017/0088267 A1 | 3/2017 | Dowty et al. | |
| 2017/0129611 A1 | 5/2017 | Morgan | |
| 2017/0240283 A1 | 8/2017 | Dowty | |
| 2017/0259921 A1 | 9/2017 | De La Garza et al. | |
| 2017/0369171 A1 | 12/2017 | Eakins | |
| 2019/0092475 A1* | 3/2019 | Carlioz | B64D 11/0606 |
| 2019/0233116 A1* | 8/2019 | Braca | B64D 11/064 |
| 2019/0248497 A1* | 8/2019 | Ersan | B64D 11/0601 |

* cited by examiner

FORWARD-FACING AIRCRAFT PASSENGER SUITE WITH ALL AISLE ACCESS

CROSS-REFERENCE AND INCORPORATION BY REFERENCE

This application is a divisional of and claims priority to U.S. application Ser. No. 15/496,349 filed Apr. 25, 2017, which is a continuation-in-part of and claiming priority to U.S. application Ser. No. 15/436,482 filed Feb. 17, 2017, which claims priority to U.S. Provisional Application No. 62/296,659 filed Feb. 18, 2016, the contents of which are hereby incorporated by reference in their entirety.

TECHNICAL FIELD AND BACKGROUND OF THE INVENTION

The present invention relates generally to aircraft seating suites and more particularly to passenger suite arrangements that provide unimpeded aisle access for each passenger. The suite arrangements are particularly intended for narrow body, single aisle passenger aircraft, such as, for example, Boeing 737 and 757 aircraft and Airbus A319 and 320 aircraft. This general class of seating is referred to as "compressed business class." Embodiments of the invention permit enhanced business class seating in these and other narrow body aircraft, increasing passenger comfort while affording the aircraft operator the ability to charge a higher fare for a seat with greater comfort and additional amenities such as a privacy wall, lie-flat capable seat, ottoman, audio/video equipment, table, closet and charging station for portable electronic devices, among other amenities. Suites are most often found on wide-body aircraft where more space is available for accommodating the travel preferences of premium class passengers who can afford to pay higher fares for more space, privacy and conveniences. While the invention is described in relation to a 5-abreast passenger suite arrangement for a single aisle aircraft, similar suite arrangements can be used for wide-body aircraft having two aisles and therefore capable of accommodating a larger number of abreast seats, as described below.

In all seating classes, there is a need to arrange the seats to maximize density without compromising space and privacy. On current wide-body aircraft, passenger seat ingress and egress is accomplished directly from longitudinal aisles that extend through the passenger cabin. As such, each suite is positioned adjacent one of the aisles or in a non-aisle position requiring the seat occupant to ingress and egress through a laterally adjacent inboard aisle suite. This has the necessary effect of interrupting the privacy of the passenger seated in the inboard aisle suite as the outboard passenger passes through the seating area of the inboard aisle suite. Such arrangements also limit the number of suites that can be positioned abreast and may require that all of the suites be positioned at an angle to the longitudinal axis of the aircraft or with some facing forward and some aft.

SUMMARY OF THE INVENTION

Accordingly, there is a need for an arrangement of aircraft passenger suites that allows a greater number of suites to be positioned abreast while at the same time allowing ingress and egress to all suites from the aisle without invading the privacy of other suite occupants.

There is also a need for an arrangement of aircraft passenger suites that allows five suites to be positioned abreast in a narrow body, single aisle passenger aircraft.

There is also a need for an arrangement of aircraft passenger suites that allows five suites to be positioned abreast and all facing in the same forward or aft direction in a narrow body, single aisle passenger aircraft.

These and other advantages are achieved by providing a seating arrangement for a cabin of a passenger aircraft that includes first, second and third suites, each including a privacy wall and a seat movable between a seating position and a lie-flat bed position, and adapted to be laterally positioned in the aircraft cabin in respective adjacent outboard, middle and inboard positions. The first, second and third suites are adapted to be positioned in a longitudinally-offset position in relation to each other and define respective ingress/egress paths to a cabin aisle extending along a longitudinal axis of an aircraft. A longitudinal axis of at least the second suite defines an angular offset relative to a longitudinal axis of the cabin aisle.

According to another embodiment of the invention, fourth and fifth suites are provided, each including a privacy wall and a seat movable between a seating position and a lie-flat bed position, and adapted to be laterally positioned in the aircraft cabin in respective adjacent inboard and outboard positions on a side of the cabin aisle opposite the first, second and third suites. The fourth and fifth suites are adapted to be positioned in a longitudinally-offset position in relation to each other to define an ingress/egress path from the fifth suite to the cabin aisle. A longitudinal axis of the fourth suite defines an angular offset relative to the longitudinal axis of the cabin aisle.

According to another embodiment of the invention, each of the first, second, third, fourth and fifth suites includes a respective ottoman positioned in spaced-apart relation to the seat for cooperatively forming the lie-flat bed.

According to another embodiment of the invention, the first and fifth suites extend on a longitudinal axis parallel to the longitudinal axis of the cabin aisle.

According to another embodiment of the invention, the first, second, third, fourth and fifth suites are laterally staggered in relation to each other such that no seat in its upright seating position laterally overlaps an adjacent seat in its upright seating position.

According to another embodiment of the invention, the ottomans are positioned in respective foot wells.

According to another embodiment of the invention, the pitch of the seats is between 32"-38" (82 cm-97 cm).

According to another embodiment of the invention, each of the first, second, third, fourth and fifth suites face in the same general forward or aft direction in relation to a direction of flight of the aircraft.

According to another embodiment of the invention, the third suite is positioned at an angle of 3 degrees in relation to the longitudinal axis of the cabin aisle.

According to another embodiment of the invention, a seating arrangement for a cabin of a passenger aircraft is provided, and includes first and second suites, each including a privacy wall and a seat movable between a seating position and a lie-flat bed position, and adapted to be laterally positioned in the aircraft cabin adjacent to each other.

According to another embodiment of the invention, the first and second suites are adapted to be positioned in a longitudinally-offset position in relation to each other and defining a respective ingress/egress path to a cabin aisle extending along a longitudinal axis of the aircraft cabin adjacent the first suite. A longitudinal axis of at least one of first and second suites defines an angular offset relative to the longitudinal axis of the cabin aisle.

According to another embodiment of the invention, each of the first and second suites includes a respective ottoman positioned in spaced-apart relation to the seat for cooperatively forming the lie-flat bed.

According to another embodiment of the invention, one of the first and second suites extends on a longitudinal axis parallel to the longitudinal axis of the cabin aisle.

According to another embodiment of the invention, the first and second suites are laterally staggered in relation to each other such that no seat in its upright seating position laterally overlaps the adjacent seat in its upright seating position.

According to another embodiment of the invention, each of the first and second suites face in the same general forward direction in relation to the direction of travel of the aircraft.

According to another embodiment of the invention, a seating arrangement for a cabin of a passenger aircraft is provided that includes first, second, third, fourth and fifth suites, each including a privacy wall, a seat movable between a seating position and a lie-flat bed position, and an ottoman positioned in spaced-apart relation to the seat for cooperatively forming the lie-flat bed. The first, second and third suites are adapted to be positioned in a longitudinally-offset position in relation to each of the other suites facing in the same general forward direction in relation to the direction of travel of the aircraft and are laterally positioned in the aircraft cabin in respective adjacent outboard, middle and inboard positions defining respective ingress/egress paths to a cabin aisle extending along a longitudinal axis of the aircraft cabin adjacent the third suite. The fourth and fifth suites are adapted to be positioned in a longitudinally-offset position in relation to each other facing in the same general forward direction in relation to the direction of travel of the aircraft and laterally positioned in the aircraft cabin in respective adjacent inboard and outboard positions on a side of the cabin aisle opposite the first, second and third suites and defining an ingress/egress path from the fifth suite to the cabin aisle. A longitudinal axis of at least the second and fourth suites define an angular offset relative to the longitudinal axis of the cabin aisle. The first, second, third, fourth and fifth suites are laterally staggered in relation to each other such that no seat in its upright seating position laterally overlaps an adjacent seat in its upright seating position.

According to another embodiment of the invention, the seats of the first and fifth suites are positioned at an outboard-facing angular offset relative to the longitudinal axis of the aircraft cabin.

According to another embodiment of the invention, the angular offset of the first and fifth seats is between 0.5 degrees and 6 degrees.

According to another embodiment of the invention, the angular offset of the first and fifth seats is 3 degrees.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF PREFERRED EMBODIMENT OF THE INVENTION

Figure 1:
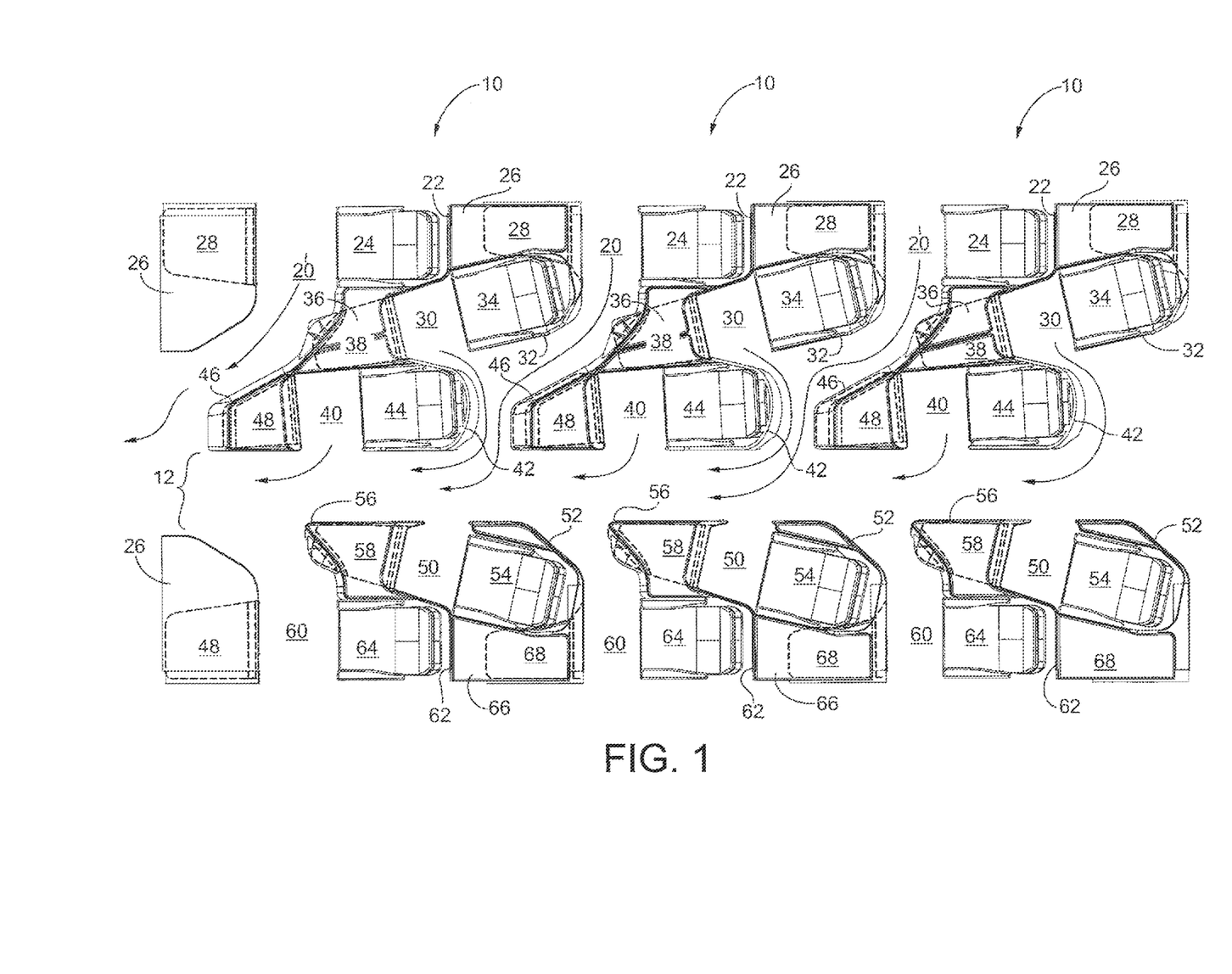
FIG. 1 is a top plan view of a 5-abreast passenger suite arrangement according to one embodiment of the invention.
Figure 2:
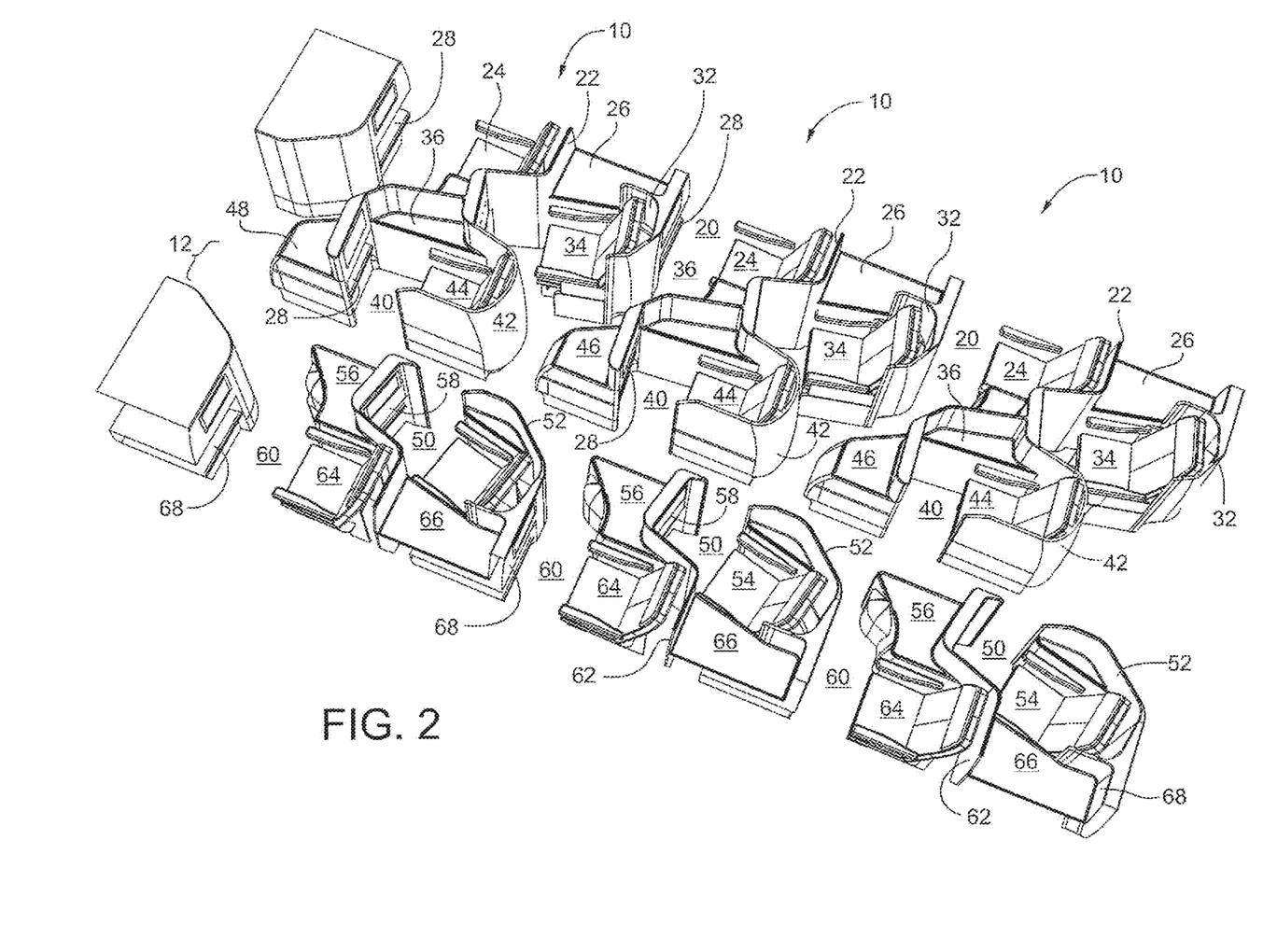
FIG. 2 is a top perspective view of the 5-abreast passenger suite arrangement shown in FIG. 1.

Referring to FIGS. 1 and 2, a series of 5-abreast seating groups 10 are shown in an orientation as installed in a cabin of a passenger aircraft, with at least one aisle 12 extending through the cabin along the longitudinal axis of the aircraft. Each seating group 10 includes five suites—20, 30, 40, 50 and 60, respectively, that extend laterally from one side of the cabin to the other. Suites 20 and 60 are denominated "outboard" or "window" suites, suites 40 and 50 are denominated "inboard" or "aisle" suites and suite 30 is denominated a "middle" suite for purposes of this application. However, in different arrangements of suites there may be other groupings of the same or similar suites where the above nomenclature does not apply. For example, suites according to the invention may be installed in aircraft either with no windows, or in locations in the cabin where windows are not present.

Window suites 20 and 60 are oriented parallel to the longitudinal axis of the cabin aisle 12. According to one embodiment of the invention, the aisle suite 40 may be angularly offset relative to the aisle 12 by 3 degrees, as shown in FIG. 1. Alternatively, the aisle suite 40 also may be oriented substantially parallel to the cabin aisle 12. In each of the embodiments, each of the suites faces in the same general forward direction in relation to the direction of flight of the aircraft.

The middle suites 30 and aisle suites 50 each define an angular offset relative to the aisle 12. While the amount of angular offset may vary, the angular offset according to one preferred embodiment is 12.7 degrees. In another embodiment of the invention, the aisle suites 40 each define an angular offset of 3 degrees relative to the aisle 12.

Each suite 20, 30, 40, 50 and 60 includes a respective privacy wall 22, 32, 42, 52 and 62, which curves around the respective suite in a manner that visually screens a suite occupant from an occupant of an adjacent suite. Each suite 20, 30, 40, 50 and 60 includes a respective seat 24, 34, 44, 54 and 64, each of which includes a seat back, seat bottom, armrests and deployable leg rest of known design and construction. Seats 24, 34, 44, 54 and 64 are of a known type that includes occupant and flight attendant-controlled actuators that move the seats among upright, semi-reclined, reclined and lie-flat bed positions.

In one embodiment, the suites 20, 30, 40, 50 and 60 include respective foot wells 26, 36, 46, 56 and 66 positioned forward of the seats 24, 34, 44, 54 and 64. The foot wells house respective ottomans 28, 38, 48, 58 and 68 and with the seats 24, 34, 44, 54 and 64 cooperatively form the lie-flat bed when the seats 24, 34, 44, 54 and 64 are deployed into the lie-flat position.

Note that seats 24, 34, 44, 54 and 64 are very substantially laterally staggered in relation to each other such that no seat in its upright seating position laterally overlaps an adjacent seat in its upright seating position. For example, seat 24 is positioned sufficiently forward of laterally adjacent seat 34 that the front of seat 34 is rearward of the back of seat 24. This arrangement not only permits all of the seats 24, 34, 44, 54 and 64 to be forward facing in the cabin, but also provides a substantially enhanced degree of privacy to each suite occupant in both the upright seating and lie-flat sleeping positions.

By continued reference to FIGS. 1 and 2, the arrangement described above permits each of the five suite occupants in each seating group 10 to move to and from aisle 12 without passing through the space of any other suite. Passengers assigned to window suites 20 can ingress and egress along a path behind the privacy walls 32 and 42 of suites 30 and 40. Passengers assigned to the middle suites 30 can ingress and egress along a path behind the privacy wall 42 of suite 40 and, of course, the occupants of aisle suites 40 can ingress and egress directly into aisle 12, as can the passengers assigned to aisle suites 50. Passengers assigned to window suites 60 can ingress and egress along a path behind the privacy wall 52 of suites 50. Arrows in FIG. 1 show the path direction for each of the above examples.

The pitch of the seats is variable but preferably fall within the range of 32"-38" (82 cm-97 cm) with 33" (84 cm) being one such pitch value. Additionally, it is not required that the pitch of each seat 24, 34, 44, 54 and 64 be the same as every other seat in the seating group 10. Pitch can vary as required as between any two seats, generally within the range of 32"-38" (82 cm-97 cm).

Figure 3:
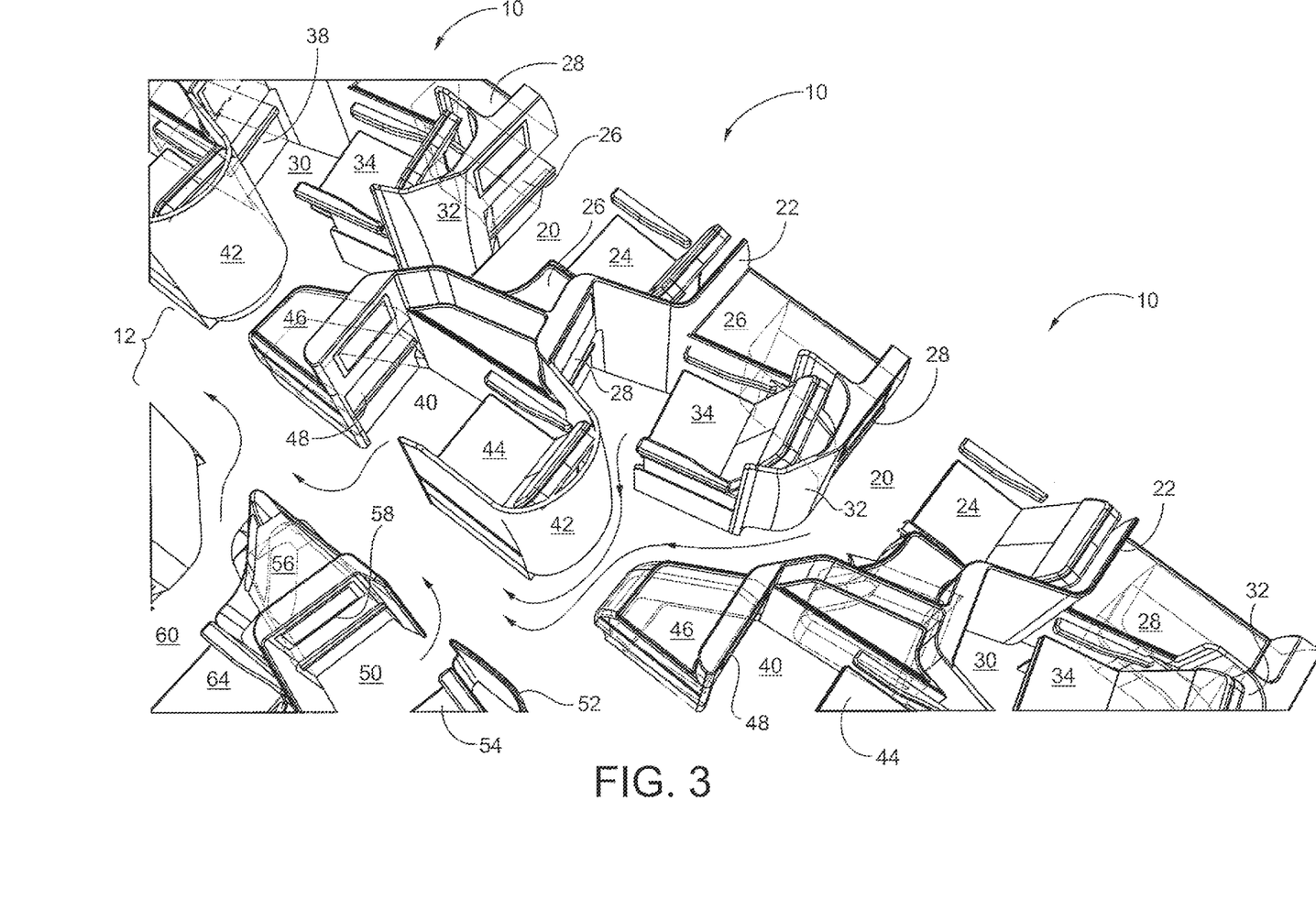
FIG. 3 is a fragmentary, enlarged forward-facing perspective view of the 3-abreast segment of the arrangement shown in FIG. 2, viewed from the aisle looking outboard.
Figure 4:
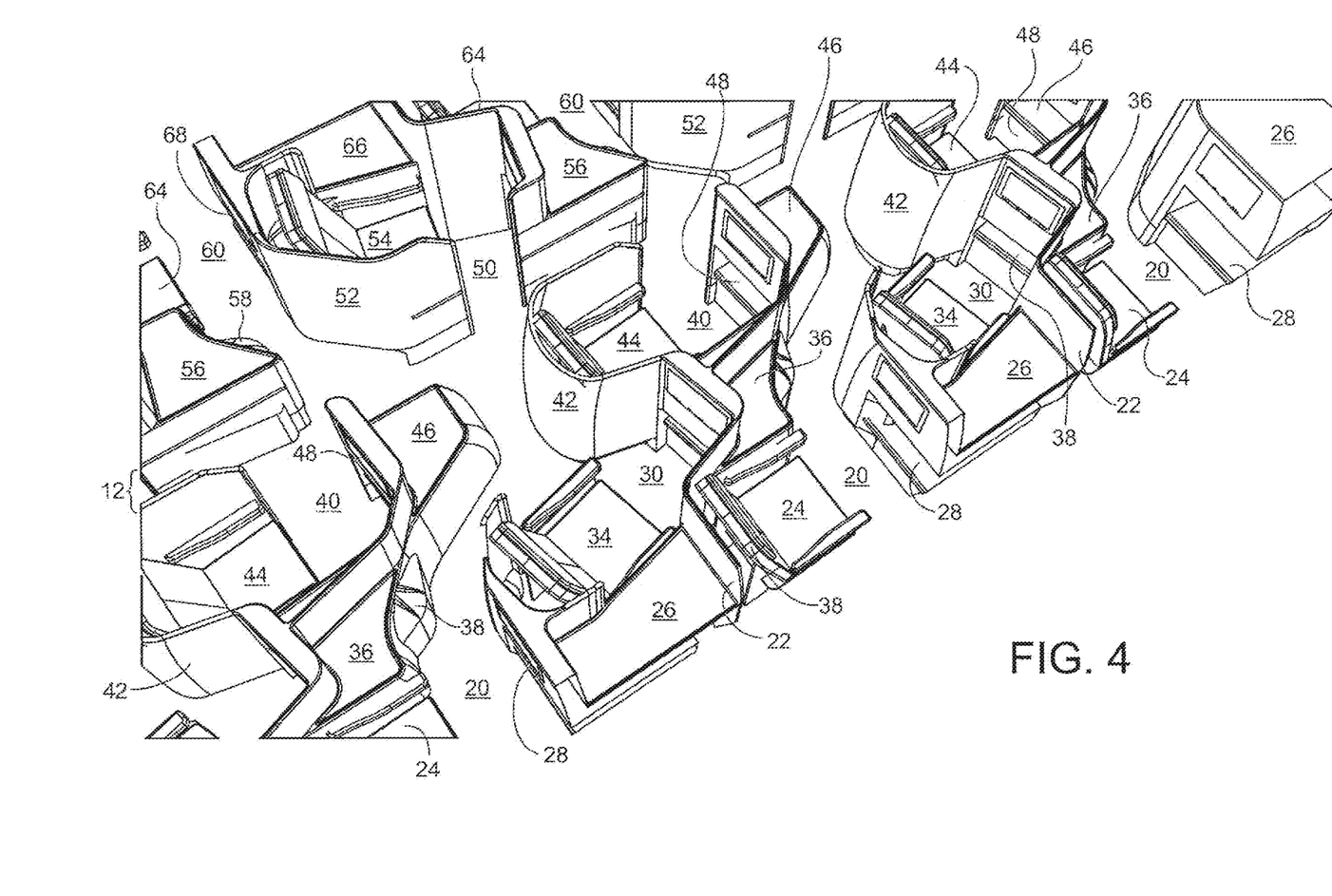
FIG. 4 is a fragmentary, enlarged forward-facing perspective view of the 3-abreast segment of the arrangement shown in FIG. 2, viewed looking outboard from the aisle.
Figure 5:
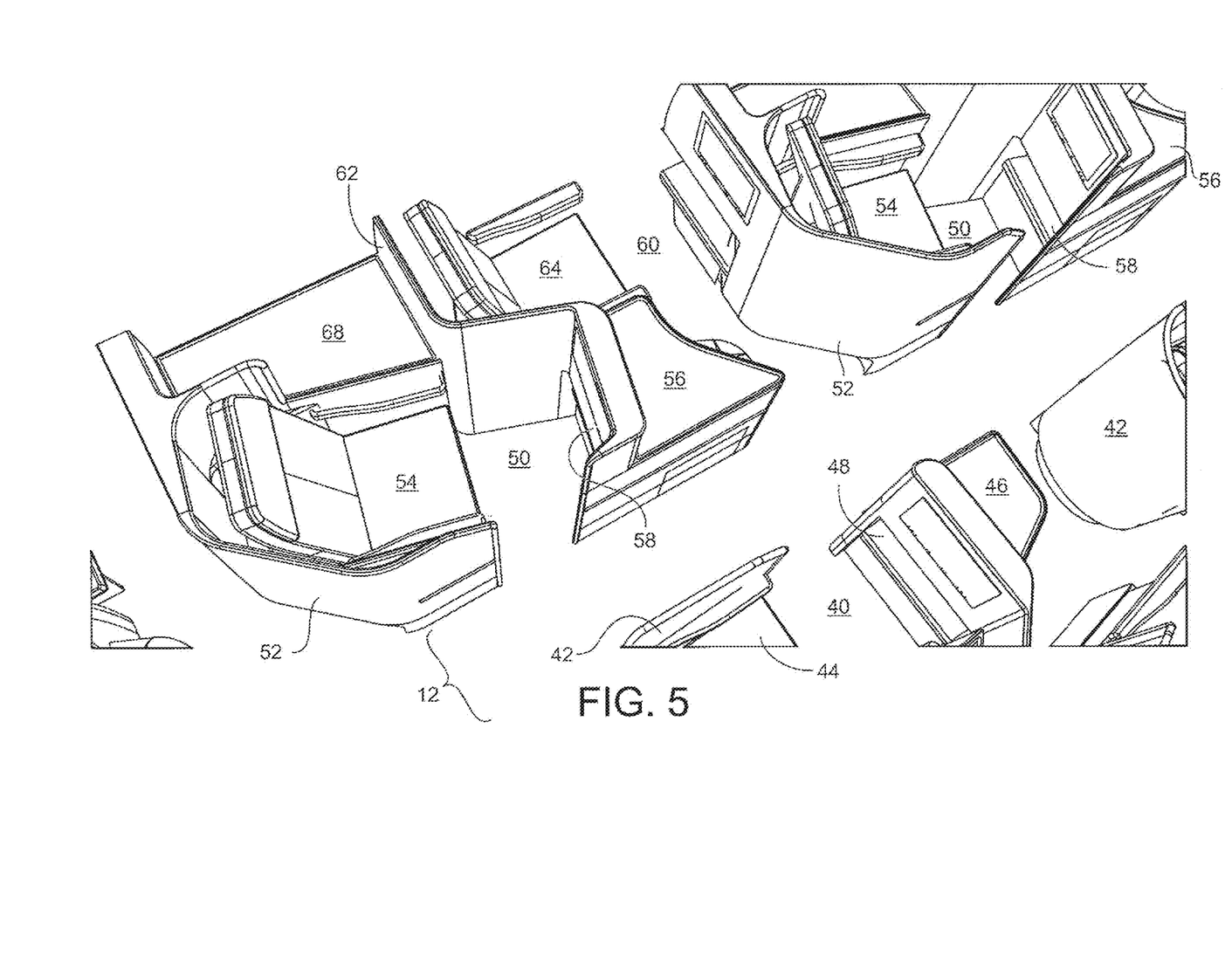
FIG. 5 is an enlarged perspective view of the 2-abreast segment of the arrangement shown in FIG. 2, viewed from the aisle looking outboard.

Other, enlarged views of the seating groups 10 from different aspects are shown in FIGS. 3-5.

Figure 6:
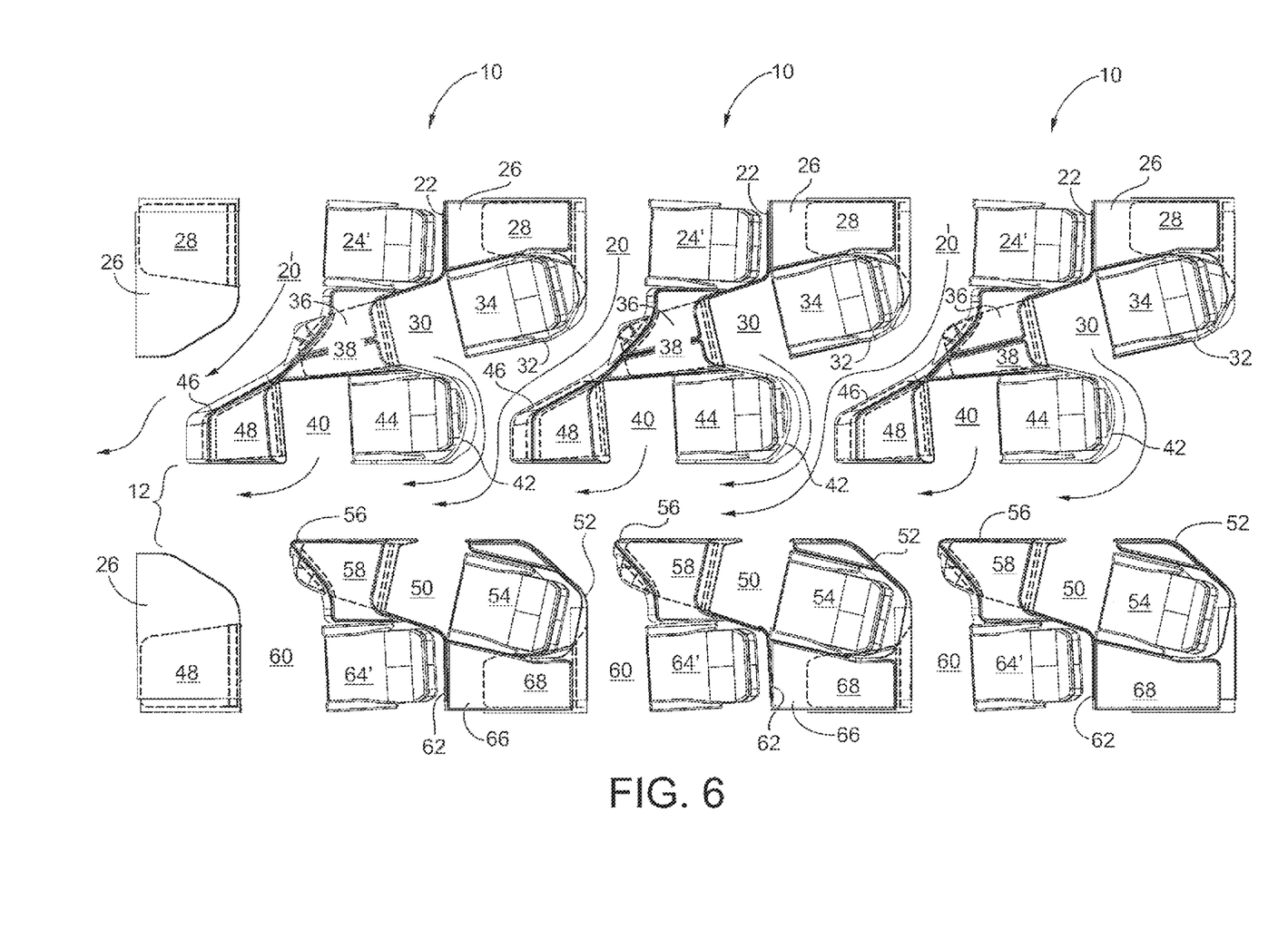
FIG. 6 is a top plan view of a 5-abreast passenger suite arrangement according to an alternative embodiment of the invention.

Referring to FIG. 6, where like reference numerals refer to like elements, in an alternative embodiment of the invention the outboard window seats 24' and 64' are positioned at an outwardly-facing angle of 3 degrees to the longitudinal axis of the aircraft cabin and the aisle 12. This angle provides more comfort and increased space for the seat occupant. In addition, this slight angle provides better alignment with the cushion edge of the ottomans 28 and 68. In the embodiment shown in FIG. 6, the foot wells 26, 66 and ottomans 28, 68 remain in the parallel position relative to the longitudinal axis of the aircraft cabin shown in FIGS. 1-5. As a further alternative, the foot wells 26, 66 and ottomans 28, 68 can also be angled, if desired. The 3 degree angle can be varied between 0.5 degrees and 6 degrees depending on cabin dimensions and seat pitch. Note that there is sufficient space between the seats 24' and 64' and the privacy walls 22 and 62 for the respective seats 24' and 64' to be angled as shown in FIG. 6 and within the range indicated.

The 5-abreast seating groups 10 can be expanded for use in wide-body aircraft by arranging the suites with a greater number of suites extending laterally across the cabin. Because wide-body aircraft have two or more aisles, the arrangement shown in the drawings can be expanded by installing a 3-abreast group of suites on an opposite side of a second aisle, whereby suites 50 and 60 become a center group of suites and the second 3-abreast group of suites become the 6th, 7th and 8th suites of an 8-abreast seating group. Other groupings are also possible and are within the scope of the invention, for example a 2-abreast, aisle, 3-abreast, aisle, 2-abreast arrangement, and a 2-abreast, aisle, 2-abreast, aisle, 2-abreast arrangement.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A passenger seating group for positioning between a longitudinal aisle and a wall, the seating group having a forward end, a back end, an aisle side, and a wall side, the seating group comprising:
   a first passenger seat positioned along the aisle side, near the back end, and facing the forward end;
   a first footwell positioned along the aisle side, near the forward end, and facing the first passenger seat;
   a second passenger seat positioned along the wall side, near the forward end, laterally adjacent the first footwell, and facing the forward end; and
   a second footwell positioned along the wall side, near the back end, laterally adjacent the first passenger seat, and facing the back end;
   a privacy wall extending continuously from the wall side, between the second passenger seat and the second footwell, and along at least a portion of an aisle side of the second passenger seat;
   wherein the privacy wall does not extend along the wall side of the second passenger seat;
   wherein access to the first passenger seat is provided between the first passenger seat and the first footwell, and access to the second passenger seat is provided forward of the forward end of the seating group;
   wherein the first passenger seat is angled toward the aisle side and the second passenger seat is parallel to the longitudinal aisle; and
   wherein, at the forward end of the seating group, the first footwell extends farther forward than the second seat.

2. The seating group according to claim 1, wherein the angle of the first passenger seat is between 2.5 degrees and 6 degrees.

3. The seating group according to claim 1, further comprising:
   a second privacy wall extending continuously along an aisle side of the first passenger seat, behind the first passenger seat, and along a top of the second footwell to the wall side.

4. The seating group according to claim 1, further comprising a first ottoman positioned in the first footwell and a second ottoman positioned in the second footwell, wherein the first footwell serves the first passenger seat and the second footwell is adapted to serve a like second passenger seat in a like seating group positionable behind the back end of the seating group.

5. The seating group according to claim 1, wherein a top of the second footwell is accessible to the first passenger seat and inaccessible to the second passenger seat, and a top of the first footwell is accessible to the second passenger seat and inaccessible to the first passenger seat.

6. The passenger seating group according to claim 1, wherein each of the first footwell and the second footwell are fixed.

7. A passenger seating arrangement positionable in an aircraft having a longitudinal aisle and a fuselage wall, comprising:
   a plurality of like seating groups positioned spaced-apart and in longitudinal alignment to form a column positioned between the longitudinal aisle and the fuselage wall, each of the plurality of like seating groups having a forward end, a back end, an aisle side, and a fuselage wall side, and each of the plurality of like seating groups comprising:
   a first passenger seat positioned along the aisle side, near the back end, and facing the forward end;

a first footwell positioned along the aisle side, near the forward end, and facing the first passenger seat;

a second passenger seat positioned along the fuselage wall side, near the forward end, laterally adjacent the first footwell, and facing the forward end;

a second footwell positioned along the fuselage wall side, near the back end, laterally adjacent the first passenger seat, and facing the back end; and a privacy wall extending continuously from the fuselage wall side, between the second passenger seat and the second footwell, and along at least a portion of an aisle side of the second passenger seat;

wherein the privacy wall does not extend along the fuselage wall side of the second passenger seat;

wherein access to the first passenger seat is provided between the first passenger seat and the first footwell, and access to the second passenger seat is provided forward of the forward end of the seating group;

wherein the first passenger seat is angled toward the aisle side and the second passenger seat is parallel to the longitudinal aisle; and wherein, at the forward end of the seating group, the first footwell extends farther forward than the second seat.

8. The passenger seating arrangement according to claim 7, wherein the first footwell serves the first passenger seat within the same seating group and the second footwell serves the second passenger seat in a longitudinally-adjacent one of the plurality of like seating groups.

9. The passenger seating arrangement according to claim 7, wherein each of the plurality of like seating groups further comprises a privacy wall extending continuously from the fuselage wall side, between the second passenger seat and the second footwell, and along at least a portion of an aisle side of the second passenger seat.

10. The passenger seating arrangement according to claim 7, wherein each of the plurality of like seating groups further comprises:

a second privacy wall extending continuously along an aisle side of the first passenger seat, behind the first passenger seat, and along a top of the second footwell to the fuselage wall side.

11. The passenger seating arrangement according to claim 7, wherein each of the plurality of like seating groups further comprises a first ottoman positioned in the first footwell and a second ottoman positioned in the second footwell, wherein the first footwell serves the first passenger seat of the same one of the plurality of like seating groups and the second footwell serves the second passenger seat in an adjacent one of the plurality of like seating groups.

12. The passenger seating arrangement according to claim 7, wherein in each of the plurality of like seating groups a top of the second footwell is accessible to the first passenger seat and inaccessible to the second passenger seat, and a top of the first footwell is accessible to the second passenger seat and inaccessible to the first passenger seat.

13. The passenger seating arrangement according to claim 7, wherein a seat pitch between each of the plurality of like seating groups is between 32 inches and 38 inches.

14. The passenger seating group according to claim 7, wherein each of the first footwell and the second footwell are fixed.

* * * * *